UNITED STATES PATENT OFFICE.

JULIUS HOFMEIER, OF VIENNA, AUSTRIA-HUNGARY.

WATER-PROOF MATERIAL FOR BINDING LEATHER OR CLOTH OR FOR LEATHER FOR DECORATING, &c.

SPECIFICATION forming part of Letters Patent No. 340,314, dated April 20, 1886.

Application filed October 29, 1885. Serial No. 181,288. (Specimens.)

*To all whom it may concern:*

Be it known that I, JULIUS HOFMEIER, of the city of Vienna, Austria-Hungary, have invented a certain new and useful Method of Manufacturing Water-Proof Material as a Substitute for Binding Leather or Cloth or for Leather for Decorating and other Purposes, &c., of which the following is a specification.

This invention refers to a new method of manufacturing water-proof material which may form a substitute for book-binders' cloth or leather or leather for fancy goods or decorating purposes, and which may also be used instead of leather for covering walls or furniture, and for many similar purposes.

The new method, according to this invention, consists, mainly, in treating cellular matter in the wide meaning of the word—such as fibers of linen, cotton, jute, wool, silkete, wood-cellulose, as well as the waste from the treatment of such fibers or cellulose, with a solution of albumen, which solution may be applied superficially or throughout the mass. To this solution I add glycerine, in order to make or render the coagulum formed ductile; and I furthermore add a solution of metal salt—such as chloride of magnesium or chloride of calcium, or, preferably, nitrate or sulphate of magnesia—for the twofold purpose, first, for increasing the capability of coagulation, and, second, for preserving it against the action of water; and in order to render the material durable—that is to say, to impart to it the strength of leather or stiff paper of strong quality—I furthermore add basic borate of soda. The solution of albumen thus prepared is brought into coagulation, and the whole is pressed in an appropriate manner between heated rollers or cylinders, which may have smooth or engraved surfaces, as desired.

I prepare the albumen solution above mentioned in the following manner: I form a concentrated solution of equal parts of albumen and glycerine, to which the necessary bulk of water is added. I then add ten per cent. of nitrate or sulphate of magnesia and five per cent. of basic borate of soda, the percentage named referring to the quantity of albumen employed. This mixture, which may be preserved for many weeks without decay or putrefaction, may be mixed with any desirable coloring material. If wood-cellulose is to be employed as the main body, I recommend the use of sulphite cellulose converted or brought into the shape of paper, which paper is then covered, by means of brushes, with the solution prepared as above specified; or, if manufacturing on a larger scale, the solution is spread over the cellulose by means of a grounding or priming machine, such as used in the manufacture of stained or colored paper. I may cause the solution to enter into or to penetrate the cellulose by applying more pressure, or by diluting the solution employed, or by moistening the cellulose. If it is desired to fully impregnate the cellulose mass with the albumen solution, I recommend to moisten the sheets of cellulose to a certain degree, and then to dip the same into the solution until the mass is impregnated throughout. The cellulose, either covered or impregnated as stated above, is thereafter coagulated on a drying-cylinder heated by steam, or it may previously undergo a drying process in heated air. The coagulum formed is then moistened on the back side, either by hand or by an appropriate apparatus, and is then pressed between heated rollers, which may have smooth or engraved surfaces, or between the plates of a bookbinder's press, such as used for gilding book-covers. It will prove to be useful for the purpose if the press-plates are heated by gas or by superheated steam. As a rule, the manufacture of the material so prepared will be completed or finished if the water with which the coagulated mass has been moistened is evaporated by the heat employed. If colored patterns or designs are to be produced, such as in paper-hangings or wall-decorations, the colors are mixed with the albumen preparation before printing the pattern. Then the colored albumen preparation is applied to the surface of the material and treated as before stated. If cellulose fibers or other fibers are mixed with the albumen preparation so as to form a stiff but yet plastic substance which is capable of being pressed into heated forms, a coagulum will be obtained which has the elasticity of leather. In this case the albumen preparation may contain less glycerine.

Instead of using fibers, as stated in the foregoing specification, woven material (which is not woven too loosely) may be employed, which may be roughened at its surface by some well-known carding or other process, in order to cause a very intimate adherence of the albumen preparation with the fibers, and to keep the coagulum upon the surface. The further manufacturing process for such woven material is the same as indicated for cellulose or other fibers. The materials thus prepared (whether made by cellulose, fibers, or woven materials) will be distinguished for consistency, lightness, suppleness, and flexibility, and they are especially adapted to use instead of all sorts of leather or linen for book-binding purposes, which substances or materials have many defects for this purpose. Especially as a remplacant for book-binders' leather those coagulum substances will prove to be superior to the linen fibers which have been used.

I claim as my invention—

1. The process herein specified for the purpose of manufacturing a water-proof material as a substitute for book-binders' linen, cloth, or leather, and for leather hangings, furniture-covers, and other purposes, consisting in mixing equal or about equal parts of albumen and glycerine, and adding about ten per cent. (of the quantity of albumen employed) of a metallic salt—such as nitrate or sulphate of magnesia, or chloride of calcium, or chloride of magnesium—and about five per cent. (of the quantity of albumen employed) of basic borate of soda, substantially as specified.

2. The process herein specified for the purpose of manufacturing a water-proof material as a substitute for book-binders' linen, cloth, or leather, and for leather hangings, furniture-covers, and other purposes, consisting in impregnating and covering textile fabrics of any kind or cellulose with a mixture of equal or about equal parts of albumen and glycerine, and adding about ten per cent. (of the quantity of albumen employed) of a metallic salt—such as nitrate or sulphate of magnesia, or chloride of calcium, or chloride of magnesium—and about five per cent. (of the quantity of albumen employed) of basic borate of soda, and transforming or converting this into a coagulum by heat, substantially as specified.

In testimony that I claim the foregoing as my invention I have signed my name in presence of two subscribing witnesses.

JULIUS HOFMEIER.

Witnesses:
  WILHELM WIESENHÜTTER,
  PAUL DRUCKMULLER.